United States Patent
Papadacci et al.

(10) Patent No.: US 12,465,330 B2
(45) Date of Patent: Nov. 11, 2025

(54) DIVERGENT LENS ARRAY

(71) Applicants: INSERM (INSTITUT NATIONAL DE LA SANTÉ ET DE LA RECHERCHE MÉDICALE), Paris (FR); CENTRE NATIONAL DE LA RECHERCHE SCIENTIFIQUE, Paris (FR); ECOLE SUPÉRIEURE DE PHYSIQUE ET DE CHIMIE INDUSTRIELLES DE LA VILLE DE PARIS, Paris (FR)

(72) Inventors: Clément Papadacci, Paris (FR); Mickael Tanter, Paris (FR); Hugues Favre, Paris (FR); Mathieu Pernot, Paris (FR)

(73) Assignees: INSERM (INSTITUT NATIONAL DE LA SANTÉ ET DE LA RECHERCHE MÉDICALE), Paris (FR); CENTRE NATIONAL DE LA RECHERCHE SCIENTIFIQUE, Paris (FR); ECOLE SUPÉRIEURE DE PHYSIQUE ET DE CHIMIE INDUSTRIELLES DE LA VILLE DE PARIS, Paris (FR)

( * ) Notice: Subject to any disclaimer, the term of this patent is extended or adjusted under 35 U.S.C. 154(b) by 113 days.

(21) Appl. No.: 18/553,591

(22) PCT Filed: Apr. 1, 2022

(86) PCT No.: PCT/EP2022/058808
§ 371 (c)(1),
(2) Date: Oct. 2, 2023

(87) PCT Pub. No.: WO2022/207928
PCT Pub. Date: Oct. 6, 2022

(65) Prior Publication Data
US 2024/0180524 A1 Jun. 6, 2024

(30) Foreign Application Priority Data

Apr. 2, 2021 (EP) .................................... 21305434

(51) Int. Cl.
*A61B 8/00* (2006.01)
*B06B 1/06* (2006.01)
(Continued)

(52) U.S. Cl.
CPC ............ *A61B 8/483* (2013.01); *A61B 8/4488* (2013.01); *A61B 8/481* (2013.01); *A61B 8/5269* (2013.01);
(Continued)

(58) Field of Classification Search
CPC ....... A61B 8/483; A61B 8/4488; A61B 8/481; A61B 8/5269; A61B 8/54; B06B 1/0629;
(Continued)

(56) References Cited

U.S. PATENT DOCUMENTS

| 4,535,630 A | * | 8/1985 | Samodovitz | G10K 11/32 310/335 |
| 4,659,956 A | * | 4/1987 | Trzaskos | G10K 11/32 310/369 |

(Continued)

OTHER PUBLICATIONS

Christensen-Jeffries Kirsten et al., "Super-resolution Ultrasound Imaging", Jan. 21, 2020 (Jan. 21, 2020), vol. 46, No. 4, p. 865-891.
(Continued)

*Primary Examiner* — Dixomara Vargas
(74) *Attorney, Agent, or Firm* — WCF IP

(57) ABSTRACT

While 3D ultrasound imaging is becoming a powerful tool in medical field, the main drawback is the difficulty to image large 3D volume, mainly related to the dimensions of the 2D array of transducers. In order to not lose in spatial resolution, it is necessary to use an array of transducers, wherein the size of the transducers does not exceed the wavelength of the
(Continued)

ultrasound wave. Such requirement leads to dimensions of array for imaging large 3D volume which are not reachable or at too high cost with the current technology. The present disclosure overcomes the above technology limitation by using greater transducers, and where each transducer has a reception surface with a curved shape or is fitted with an acoustic lens. Such configuration of transducers leads to 2D array of transducers suitable for imaging large 3D volume, as a brain or a heart, with high resolution and high sensitivity.

15 Claims, 10 Drawing Sheets

(51) Int. Cl.
  *G01S 7/52* (2006.01)
  *G01S 15/89* (2006.01)
(52) U.S. Cl.
  CPC .............. *A61B 8/54* (2013.01); *B06B 1/0629* (2013.01); *B06B 1/0651* (2013.01); *G01S 7/52039* (2013.01); *G01S 7/52046* (2013.01); *G01S 7/52079* (2013.01); *G01S 15/8925* (2013.01); *G01S 15/8981* (2013.01); *G01S 15/8993* (2013.01); *G01S 15/8997* (2013.01); *B06B 2201/76* (2013.01)
(58) Field of Classification Search
  CPC .............. B06B 1/0651; B06B 2201/76; G01S 7/52039; G01S 7/52046; G01S 7/52079; G01S 15/8925; G01S 15/8981
  See application file for complete search history.

(56) References Cited

U.S. PATENT DOCUMENTS

| | | | | |
|---|---|---|---|---|
| 4,915,115 A * | 4/1990 | Sasaki | ................ | G01S 15/8979 600/441 |
| 5,148,810 A * | 9/1992 | Maslak | ................ | G10K 11/343 600/447 |
| 5,235,986 A * | 8/1993 | Maslak | ................ | G01S 15/8927 600/447 |
| 5,911,692 A * | 6/1999 | Hussain | ................ | B06B 1/0622 600/447 |
| 7,982,369 B2 * | 7/2011 | Ona | ................ | B06B 1/0622 381/174 |
| 2002/0007118 A1 * | 1/2002 | Adachi | ................ | G01S 15/8922 600/443 |
| 2003/0163046 A1 * | 8/2003 | Nohara | ................ | G01S 15/8927 600/443 |
| 2005/0081636 A1 | 4/2005 | Barshinger et al. | | |
| 2005/0288588 A1 * | 12/2005 | Weber | ................ | A61B 8/483 600/447 |
| 2008/0139937 A1 | 6/2008 | Nohara et al. | | |
| 2012/0143063 A1 * | 6/2012 | Robinson | ................ | A61B 8/145 600/472 |
| 2014/0046186 A1 | 2/2014 | Mauldin, Jr. et al. | | |
| 2015/0257734 A1 * | 9/2015 | Chaggares | ................ | H10N 30/04 156/60 |
| 2017/0043189 A1 * | 2/2017 | Stoddard | ................ | G10K 11/24 |
| 2018/0228464 A1 * | 8/2018 | Yang | ................ | A61B 5/0062 |
| 2019/0003958 A1 * | 1/2019 | Nanaumi | ................ | G01N 21/1702 |
| 2019/0030375 A1 * | 1/2019 | Zachar | ................ | A61N 7/02 |
| 2020/0275910 A1 | 9/2020 | Specht et al. | | |
| 2020/0319336 A1 | 10/2020 | Fleury et al. | | |
| 2021/0173061 A1 * | 6/2021 | Fyler | ................ | G01S 7/521 |
| 2023/0075328 A1 * | 3/2023 | Zemp | ................ | B06B 1/0215 |

OTHER PUBLICATIONS

Tsutomu Kobayashi, "Characteristics of the Plano-Convex Ultrasonic Transducer", Japanese Journal of Applied Physics,, vol. 24, No. 24, Jan. 1, 1985 (Jan. 1, 1985), p. 58-61.

* cited by examiner

DIVERGENT LENS ARRAY

TECHNICAL FIELD

The present invention relates to ultrasound imaging techniques, and in particular to techniques for 3D volumetric imaging with a large field of view.

BACKGROUND ART

Nowadays, the interest to use ultrasound waves in the medical field no longer needs to be proven.

Generally, ultrasounds may be generated from a probe comprising an array of a plurality of transducers able to generate individually ultrasound waves. These ultrasound waves may be directed toward a medium which may generate in response backscattered signals, which in turn may be recorded by the same array of transducers or a different array. From the backscattered signal, it may be possible to reconstruct a 2D or 3D image of the medium. The recent progress in the ultrasound imaging field leads to the possibility to make 4D ultrasound imaging allowing to obtain animated 3D ultrasound imaging.

While 3D or 4D ultrasound imaging is becoming a powerful tool in medical field, their main drawback is the difficulty to image large 3D volume. Indeed, the capacity to image large 3D volume is directly related to the dimension of the array of transducers. In order to not lose in spatial resolution, it is necessary to use an array of transducers, wherein the size of the transducers does not exceed the wavelength of the ultrasound wave. This requirement leads to configurations of array which are not reachable or at too high cost with the current technology. For instance, a probe with an opening of 10 cm×10 cm (i.e. array of 10 cm×10 cm) and a size of transducer around 250 micrometers (corresponding to a central frequency of 6 MHz) leads to an array of 160000 transducers in order to keep a good resolution in 3D imaging and large field of view.

In order to perform 3D volumetric imaging with a large field of view, the prior art uses a sparse matrix which consists to use an array with fewer transducers. Although a sparse matrix allows to perform 3D volumetric imaging, the lower number of transducers impacts the quality of the 3D imaging.

Furthermore, both classic arrays or sparse arrays usually do not allow to perform 3D or 4D ultrasound volumetric imaging of a whole organ which may be behind bones, and with enough resolution and sensitivity to determine specific locations (e.g. disease) in the imaged organ. Indeed, because of the strong absorption of the bones, prior art usually uses opening (artificial or natural) in the bones to perform ultrasound 3D imaging making difficult large field of view imaging and the possibility to determine specific location with high lateral resolution.

Therefore, there is a need to perform 3D ultrasound volumetric imaging with a large field of view without loss of image quality, and particularly, a need to perform 3D ultrasound volumetric imaging of organs which may in certain cases be located behind bones.

SUMMARY

To this end, the present disclosure proposes an ultrasound 3D imaging probe which may comprise an array having transducers, each transducer may be configured for at least acquiring a backscattered ultrasonic wave from a region to image in a medium following an ultrasound emission in said medium, said backscattered ultrasonic wave may have a certain central frequency corresponding to a certain wavelength $\lambda$ when said backscattered ultrasonic wave is propagated in said medium, said array forming an array surface adapted to be placed in contact with said medium and each transducer may have a reception surface for at least receiving said backscattered ultrasonic waves, wherein each transducer may have a shape in the array surface which defines an inscribed circle having a diameter larger than $2\lambda$, and wherein each transducer:
either may have a curved shape of the reception surface with a curvature in at least one plane perpendicular to said reception surface,
and/or may be fitted with an acoustic lens designed to emulate a transducer with a curved shape with a curvature in at least one plane perpendicular to said reception surface,
and/or is formed by a matrix of transducer elements adapted to be controlled independently.

Thus, advantageously, the use of transducers which have a shape in the array surface which defines an inscribed circle having a diameter larger than $2\lambda$ allows to overcome the technology limitation preventing the use of probe with large surface needed to perform large field of view in an ultrasound image. Furthermore, the use of greater reception surface for the transducers combined to the use of curved shape or/and an acoustic lens designed to emulate a curved transducer (e.g. divergent lens) for the reception surface allow to increase the lateral and temporal resolution which should normally not be the case for transducers which have a shape in the array surface which defines an inscribed circle having a diameter larger than $2\lambda$.

The emission of ultrasound wave (e.g. from a transducer) or the reception of ultrasound wave (i.e. backscattered ultrasonic wave from the medium) may be defocused. Each transducer having a curved shape or having an acoustic lens designed to emulate a curved transducer or being formed by a matrix of transducer elements adapted to be controlled independently may be configured to increase the opening angle of the transducers (i.e. decrease the directivity), i.e. may act as a divergent lens, and therefore may be configured to defocus the ultrasound wave in reception or/and in emission.

The ultrasound 3D imaging probe having transducers which have a shape in the array surface which defines an inscribed circle having a diameter larger than $2\lambda$ combined with a curved shape or having an acoustic lens designed to emulate a curved transducer or being formed by a matrix of transducer elements adapted to be controlled independently may enable to transmit and/or receive ultrasound wave(s) with high amplitude due the diameter larger than $2\lambda$ and may enable to maintain a low directivity by transmitting diverging (or divergent) ultrasound wave(s) in the medium, and which may allow to increase image/volume quality in terms of field of view, resolution, and sensitivity.

Thus, such dispositions lead to the possibility to perform 3D or 4D ultrasound imaging with large field of view.

By transducer with a curved shape, it should be understood a transducer with a curved transmitting or/and receiving surface.

The medium may be or include for instance a medium as water or/and soft tissue.

In one or several embodiments, the reception surface of each transducer may have a curved shape and the curvature may have at least one curvature radius comprised between $\lambda$ and $40\lambda$.

In one or several embodiments, the reception surface of each transducer may have a curved shape and the curved shape may be convex.

In one or several embodiments, the reception surface of each transducer may be fitted with an acoustic lens designed to emulate a transducer with a curved shape, the acoustic lens may have an outer surface, opposite said reception surface of the transducer, said outer surface may be convex or concave.

In one or several embodiments, the outer surface may be convex and may have a curvature in at least one plane perpendicular to said outer surface and said curvature may have at least one curvature radius comprised between $\lambda$ and $40\lambda$.

In one or several embodiments, the outer surface may be concave and may have a curvature in at least one plane perpendicular to said outer surface and said curvature may have at least one curvature radius comprised between $\lambda$ and $40\lambda$.

In one or several embodiments, the acoustic lens may be a compound acoustic lens comprising several materials associated respectively to several sound velocities.

In one or several embodiments, the array may have a surface area which may be larger than $1000\lambda^2$.

In one or several embodiments, the diameter may be larger than 30 micrometers.

In one or several embodiments, the diameter may be between 100 and 2000 micrometers.

In one or several embodiments, the central frequency may be comprised between 0.5 and 100 MHz, preferentially between 1 and 10 MHz.

The present disclosure also concerns an ultrasound 3D imaging device, the ultrasound 3D imaging device may comprise at least:
  an ultrasound 3D imaging probe according to the present disclosure;
  a control unit configured for acquiring signals from said backscattered ultrasonic waves received by the transducers from the region to image in response to each transmitted ultrasonic wave, wherein the control unit may be further configured for generating a 3D image based on the acquired signals.

In one or several embodiments, the control unit may be further configured to have said transducers transmit ultrasonic waves in the region to image to generate said backscattered ultrasonic waves.

Thus, advantageously, the use of transducers of larger dimensions than conventional transducers allows to transmit more energy in the medium and to obtain a better sensitivity in reception.

In one or several embodiments, the control unit may be further configured to apply a corrective delay on the acquired signals obtained after transmission of each transmitted ultrasonic wave, said corrective delay taking into account the curved shape of the transmission surface.

In one or several embodiments, each transducer of the ultrasound 3D imaging probe may be formed by a matrix of transducer elements adapted to be controlled independently, and the control unit may be configured to apply time delays on the transducer elements of the matrix of a transducer to emulate a transducer with a curved shape at the transducer scale.

The present disclosure also concerns an ultrasound imaging method including using an ultrasound 3D imaging probe according to the present disclosure for acquiring backscattered ultrasonic waves propagated in a region to image, the backscattered ultrasonic waves may have the wavelength $\lambda$.

The present disclosure also concerns an ultrasound imaging method including using an ultrasound 3D imaging device according to the present disclosure for acquiring signals from backscattered ultrasonic waves propagated in a region to image in response to each transmitted ultrasonic wave and for generating a 3D image based on the acquired signals, the backscattered ultrasonic waves may have the wavelength $\lambda$.

In one or several embodiments, the ultrasonic waves are transmitted in the region to image according to a synthetic aperture method.

In one or several embodiments, the ultrasound imaging method including using an ultrasound 3D imaging device may further comprise:
  applying a corrective delay on the acquired signals obtained after each transmitted ultrasonic wave to obtain a corrected acquired signals, said corrective delay taking into account the curved shape of the transmission surface,
  applying beamforming on the corrected acquired signals to perform dynamic focusing and generating the 3D image; said beamforming may be performed in reception for each transmitted wave to perform coherent compounding or synthetic aperture imaging.

In one or several embodiments, a number of transmitted ultrasonic waves may be used to perform one 3D image, said number may be less than 100.

In one or several embodiments, the number of transmitted ultrasonic waves used to perform one 3D image may be less than 30.

In one or several embodiments, microbubbles may be present in the medium to image and may be localized and/or tracked in the 3D image using a super-localization algorithm.

In one or several embodiments, the superlocalization algorithm may comprise:
  /a/ detecting the microbubbles, including:
    applying a SVD clutter filter on 3D B-mode volumes to remove signal from the tissue and only keep microbubbles,
    detecting local maxima in each 3D B-mode volumes,
    applying an energy level threshold based on the mean energy level of a microbubble to remove false positive microbubbles,
    applying a correlation value threshold based on 3D Point Spread Function (PSF) correlation to remove false positive microbubbles,
  /b/ tracking the microbubbles by:
    detecting the exact center of a microbubble by using a 3D paraboloid interpolation on the voxels around the microbubble maximum,
    using coordinates of exact centers, tracking bubbles frame to frame
    recovering location and speed of track,
  /c/ generating a super-resolved volume by:
    reconstructing a super-resolved volume on a grid, the density of the super-resolved volume is the number of microbubbles in each voxel of the grid, the speed of the super-resolved volume is the average speed in each voxel of the grid,
  /d/ generating a 3D super resolved image based on the super resolved volume.

By SVD, it should be understood a singular value decomposition.

In one or several embodiments, time delays may be applied on the transducer elements of the matrix of a transducer to emulate a transducer with a curved shape at the transducer scale.

BRIEF DESCRIPTION OF DRAWINGS

Other features, details and advantages will be shown in the following detailed description and on the figures, on which.

DESCRIPTION OF EMBODIMENTS

In the Figures, the same references denote identical or similar elements.

Figure 1:
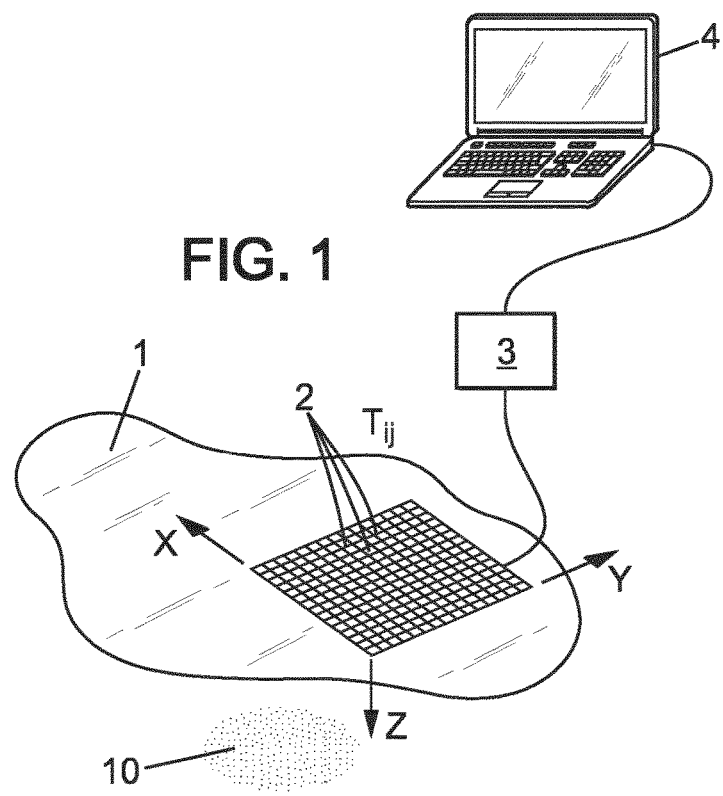
FIGS. 1 and 2 illustrate an example of apparatus for ultrasound imaging.
Figure 2:
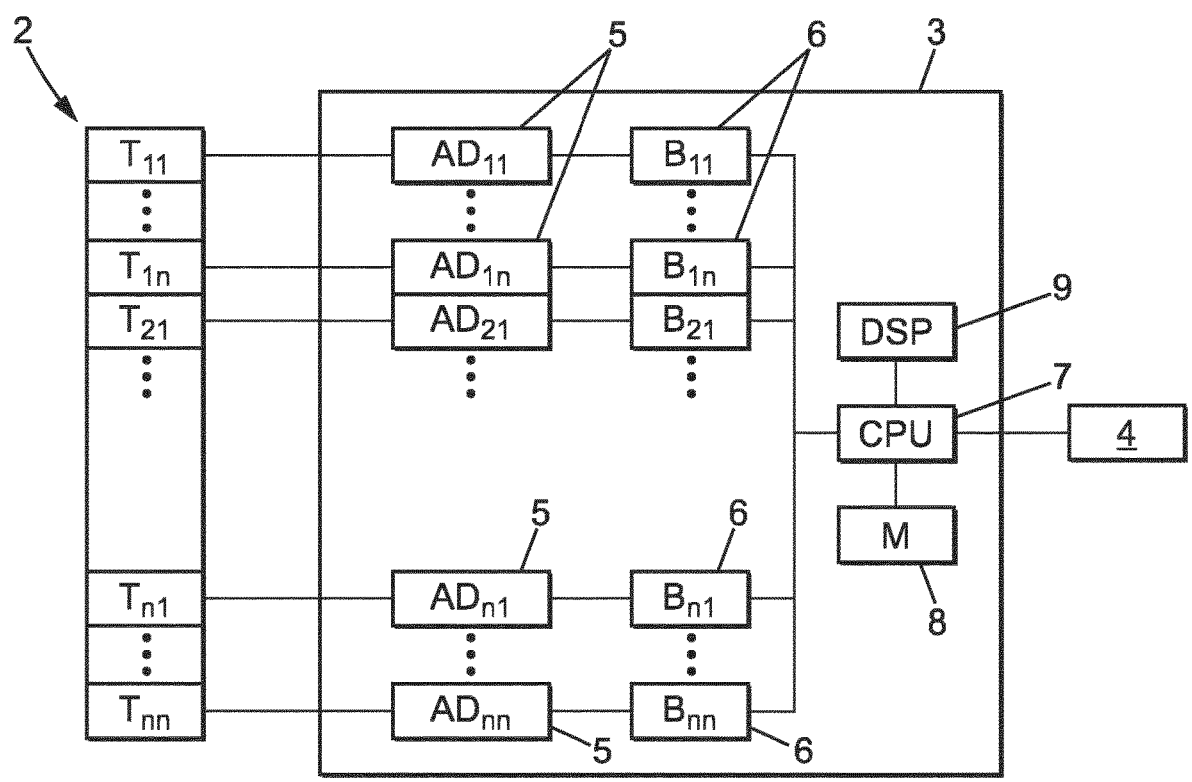

FIGS. 1 and 2 illustrate an example of apparatus for ultrasound imaging.

The apparatus shown on FIGS. 1 and 2 may be adapted to ultrafast 3D or 4D ultrasound imaging, for instance for imaging a region of a medium. The medium may be a body of a living being, e.g. a human patient. The region to image may be a brain or part of the brain of the living being, or may be a heart or a part of the heart of the living being.

The apparatus may include for instance at least a 2D array ultrasonic probe 2 and a control system. The apparatus may cover only a portion on the brain or the entire brain of the living being.

The 2D array ultrasonic probe 2 may have for instance a number N of few hundreds to a few thousand transducer $T_{ij}$, with a pitch lower than 1 mm. The transducers of the 2D array ultrasonic probe may present different shapes in the XY plan. In one embodiment, the shape of the transducer may be square, rectangular or circular. The thickness of the transducer may be comprised between 10 and 1000 micrometers depending on the piezoelectric materials.

The 2D array ultrasonic probe 2 may have n*n transducers disposed as a matrix along two perpendicular axes X, Y, transmitting ultrasound waves along an axis Z which is perpendicular to the XY plane. In one specific example, the 2D array ultrasonic probe 2 may have 256 transducers $T_{ij}$ (16×16), with a 6 mm pitch.

Furthermore, the 2D array ultrasonic probe may be configured to work as a receiver, or emitter, or emitter and receiver.

The frequency of the ultrasound waves (or central frequency) may be comprised for instance between 0.5 and 100 MHz, for instance between 1 and 10 MHz.

Furthermore, the control system may be programmed (or configured) such that the ultrasonic waves may be transmitted at a rate more than 100 ultrasonic waves per second, for instance hundreds to several thousands of ultrasonic waves per second.

The control system may for instance include a control unit 3 and a computer 4. In this example, the control unit 3 is used for controlling 2D array ultrasonic probe 2 and acquiring signals therefrom, while the computer 4 is used for controlling the control unit 3, generating 3D image sequences from the signals acquired by control unit 3 and determining quantification parameters therefrom. In a variant, a single electronic device could fulfill all the functionalities of control unit 3 and computer 4.

As shown on FIG. 2, control unit 3 may include for instance:
- n*n analog/digital converters 5 ($AD_{ij}$) individually connected to the n transducers $T_{ij}$ of 2D array ultrasonic probe 2;
- n*n buffer memories 6 ($B_{ij}$) respectively connected to the n*n analog/digital converters 5;
- a central processing unit 7 (CPU) communicating with the buffer memories 6 and the computer 4;
- a memory 8 (MEM) connected to the central processing unit 7;
- a digital signal processor 9 (DSP) connected to the central processing unit 7.

Figure 3:
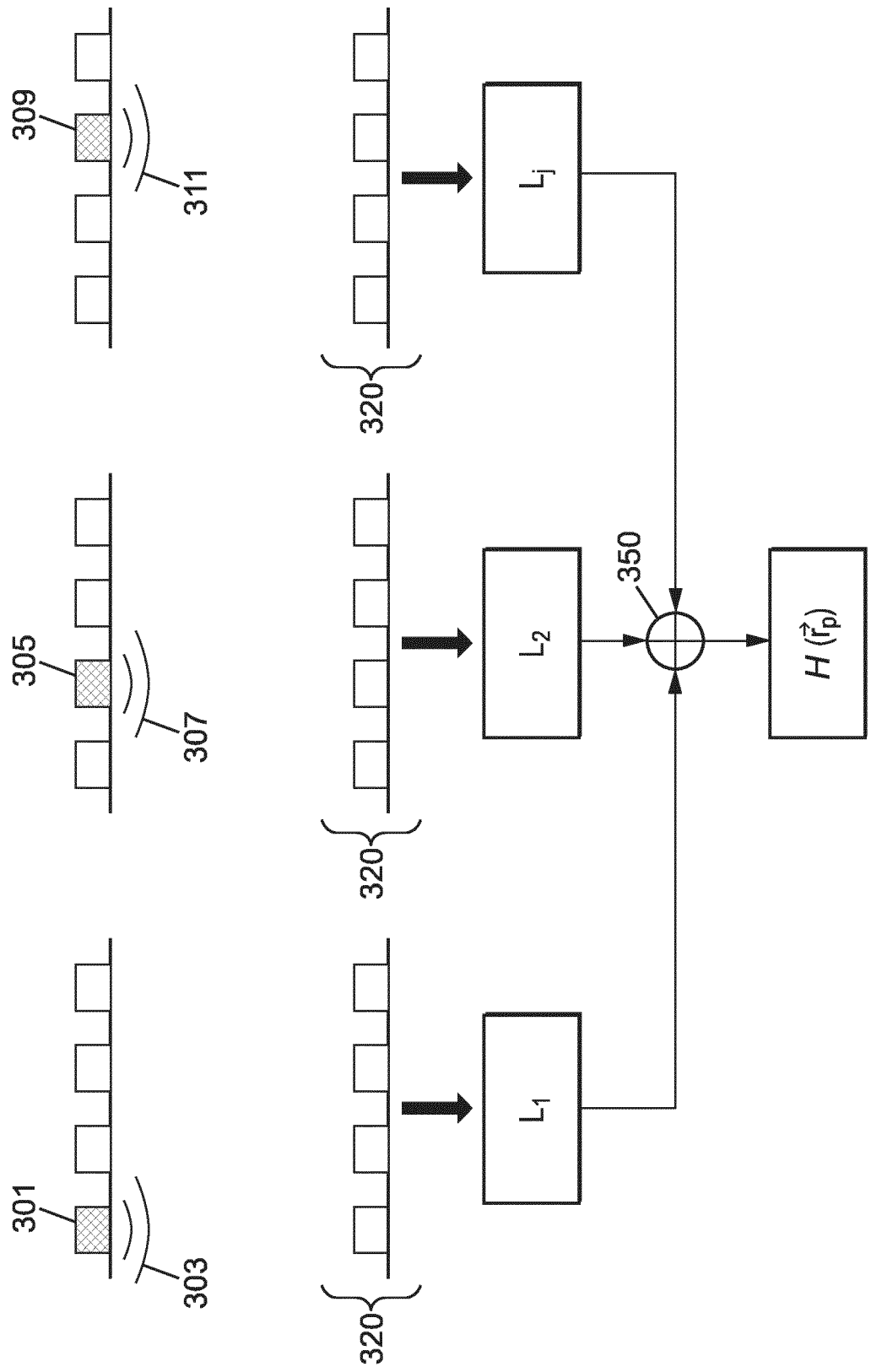
FIG. 3 shows an example of acquisition and imaging in the synthetic aperture approach.

FIG. 3 shows an example of acquisition and imaging in the synthetic aperture approach.

The ultrasonic 2D array probe 2 may be put in contact with a surface 1 of the medium (e.g. an outside surface of a head of a living being) close to the region 10 to image (e.g. a brain or part of the brain). The ultrasonic 2D array, controlled by the control unit 3, may have the transducers transmit (one transducer at a time in this example) at least one ultrasound wave in the medium. After each emitting the ultrasonic wave, the N transducers may be configured to receive the backscattered signals generated region 10 to image in the medium. For instance, the transmitted ultrasound wave may be a spherical wave and allow to cover the full region 10 to image. Thus, at instant t0, the transducer 301 may transmit a spherical wave 303 in the medium 10 and the generated backscattered signal may be received by all the N transducers 320. At t1 (t0+Δt), the transducer 305 may transmit a spherical wave 307 in the medium and the generated backscattered signal may be received by all the N transducers 320, at tk (t0+k·Δt), the transducer N 309 may transmit a spherical wave 311 in the medium 10 and the generated backscattered signal may be received by all the N transducers 320, etc.

According to one embodiment, the ultrasonic 2D array may use only one transducer every K transducer for emissions. In one preferred embodiment, K may be greater or equal than 2. For instance, the ultrasonic 2D array may use every two transducers (K=2), or every four transducers (K=4) in emission. In one or several embodiments, the ultrasonic 2D array may use by at least one cluster of P transducers in emission, P may be comprised between 64 and 10,000 transducers. Thus, in this embodiment, contrary to the conventional synthetic aperture approach which uses each transducer in turn to transmit the ultrasound wave in the medium, firing every K transducer allows to keep a fast imaging ratio even with the synthetic aperture approach.

For each transmitted signal by a transducer, backscattered signals may be generated by the medium in response to the transmitted signal. The generated backscattered signals contain information about scatters in the region 10 to image after each emission by transducers 301; 305; 309. The generated backscattered signals may be received by all the N transducers 320 and may be then respectively digitized by the analog-digital converters 5 and memorized in the n buffer memories 6. The data stored in the n buffer memories after each firing of ultrasound wave (e.g. spherical wave) may be called hereafter the raw signal data.

Then, the raw signal data obtained after one emission by a transducer may be steered and focused (i.e. beamforming) at all image points to form a low-resolution image after one emission. Thus, for instance, the low-resolution image L-img_01 may be made from an ultrasound signal transmitted by the transducer 301 and the generated backscattered signal received by the all transducers 320.

By transducers 301; 305; 309 etc. in turn, it is possible to get a plurality of low-resolution images $L_1$, $L_2$, $L_j$ which may be summed at 350 to reconstruct a full high resolution image $H(\vec{r}_p)$ (e.g. 3D image).

The focusing may be done for every point in the image by coherently summing the signals received by the transducer.

Since the position of emission in the ultrasonic 2D array is known, the precise time from emission to reception may be calculated and used in the focusing in reception. The distance from the source of a spherical wave to a point in the image and back to the receiving transducer may be:

$$d(\vec{r}_p, \vec{r}_t, \vec{r}_r) = |\vec{r}_p - \vec{r}_t| + |\vec{r}_p - \vec{r}_r| \qquad (1)$$

In this equation, $\vec{r}_p$ may correspond to the point in the image, $\vec{r}_t$ may be the location of the middle of the transmit transducer, and $\vec{r}_r$ may correspond to the location of the middle of the receiving transducer. Thus, the focusing in reception for a single emission may be performed by adding the received signal g(t, i) from all transducers in phase, $\vec{r}_r(i)$ may be the position of the i-th receive transducers. Thus, the focused signal L may be:

$$L_j(\vec{r}_p) = \sum_{i=1}^{N_r} g\left(\frac{d(\vec{r}_p, \vec{r}_t(j), \vec{r}_r(i))}{c}, i\right) \qquad (2)$$

C is the speed of sound, i is the receive transducer number, and $N_r$ is the number of receiving transducers (with $N_r \leq N$). This may be done for every point $\vec{r}_p$ in the resulting image to yield a low-resolution image. The focusing for every point $\vec{r}_p$ may be performed by taking account a forward delay or a backward delay. The forward delay may correspond to the distance $|\vec{r}_p - \vec{r}_t|$ divided by the speed of sound C in the medium, and the backward delay may correspond to the distance $|\vec{r}_p - \vec{r}_r|$ divided by the speed of sound C in the medium. Thus, each low-resolution image may be obtained from the equation (2) applied to all points of a respective low-resolution image.

A high-resolution image may be then obtained by the summation of low-resolution images. Thus, for one point $\vec{r}_p$ of the high-resolution image $H(\vec{r}_p)$, the synthetic focusing may be obtained by adding the signal for all emission (or firing) according to:

$$H(\vec{r}_p) = \sum_{j=1}^{N_t} L_j(\vec{r}_p) \qquad (3)$$

Here $N_t$ is the number of transmitting events, and $H(\vec{r}_p)$ is denoted a high-resolution image.

The synthetic aperture approach is described more in detail in the following documents:

[1] J. A. Jensen, S. I. Nikolov, U.S. Pat. No. 6,689,063, "Method and apparatus for acquiring images by recursive ultrasound images",

[2] J. A. Jensen, S. I. Nikolov, K. L. Gammelmark, M. H. Pedersen, "Synthetic Aperture Ultrasound Imaging," Ultrasonics, Elsevier, The Netherlands, vol. 44, no. 1, pp. e5-e16, 2006.

A fundamental problem in the conventional synthetic aperture imaging is the poor signal-to-noise ratio in the images, since a single transducer is used for emission. This gives a much lower emitted energy compared to using the full aperture in conventional imaging and therefore limits the depth of penetration.

Such limitations in the synthetic aperture imaging may be overcome by the use of specific dimensions of transducers as presented in this present disclosure and described below.

More precisely, each transducer has a shape in the array surface which defines an inscribed circle having a diameter larger than $2\lambda$, the wavelength $\lambda$ corresponding to the frequency of the ultrasound waves (e.g. the central frequency).

For ultrasound waves having a frequency of 1 MHz propagated in water (or in a human body), the wavelength corresponds to 1.54 mm.

In one or several embodiments, the diameter of the inscribed circle may be for instance comprised between $2\lambda$ and $10\lambda$.

In one or several embodiments, the diameter of the inscribed circle may be generally larger than 30 micrometers, for instance between 100 and 2000 micrometers.

In one or several embodiments, rather than the diameter of an inscribed circle, it may be possible to use the dimension of a diagonal of the transducer in the surface array, the diagonal passing through a central point of the transducer. In such example, the length of the diagonal of the transducer may be greater than twice the wavelength.

According to another example, in the case where the transducers present a circular shape, the diameter of the circular shape in the array surface correspond to the diameter of the inscribed circle.

Thus, thanks to the use of larger transducers (i.e. of larger surface area), it may be possible to pave (or cover) with such transducers, a probe comprising a large surface (e.g. larger than 10 cm×10 cm) needed to realize 3D or 4D ultrasound volumetric imaging with a large field of view without increasing the number of transducers, which is usually costly and difficult from a technological point of view. In addition, the use of larger transducers allows to increase the sensitivity of the transducers in comparison to conventional dimensions of transducers (0.5×0.5$\lambda$, $\lambda$=250 µm for instance), and also allows to overcome the above-mentioned limitation of the synthetic aperture. The use of larger transducers may also allow to transmit higher energy and therefore increase the depth of penetration of the ultrasonic waves in the medium.

However, the use of dimensions larger than twice the wavelength may lead to a strong directivity of each transducer. For instance, at a frequency of 1 MHz corresponding to a wavelength λ of 1.54 mm in water for instance, the directivity for a square transducer with dimensions of 4λ×4λ, i.e. corresponding to an inscribed circle with a diameter of 4λ, may be comprised between 0 and 45 degrees.

Therefore, it may be more difficult to detect off-axis backscattered signals, which may decrease the spatial resolution of the obtained 3D image.

Therefore, to compensate the use of dimensions of transducer larger than twice the wavelength, each transducer may present a transmission/reception surface with a curved shape (e.g. convex) or/and may comprise an acoustic lens, designed to emulate a transducer with a curved shape, and located on the transmission/reception surface (of the transducer), or/and may be subdivided in a custom arrangement of a matrix of transducer elements which are adapted to be controlled independently in order to emulate a curved transducer surface at the transducer scale.

FIG. 4a to FIG. 4d illustrate schematically one example of a curved shape for the transmission/reception surface of the transducer.

Figure 4A:
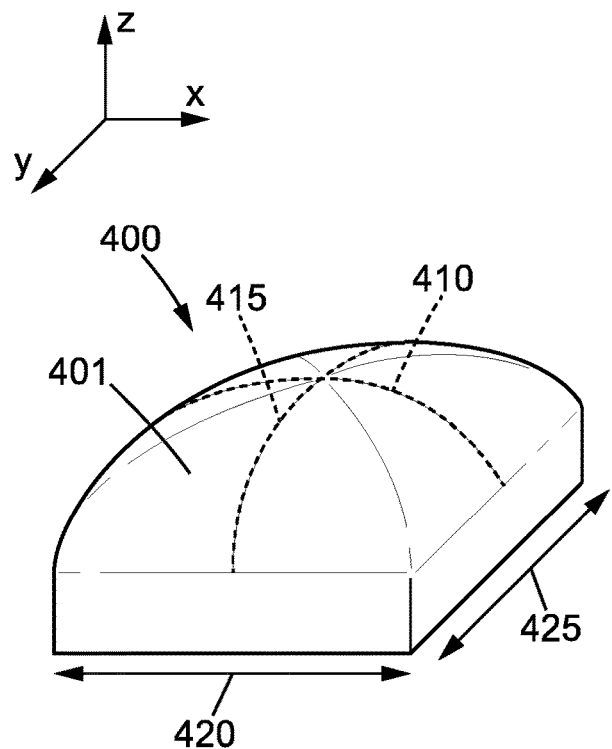
FIG. 4a to FIG. 4d illustrate schematically, in one or several embodiments, one example of a curved shape for the reception surface of a transducer.
Figure 4B:
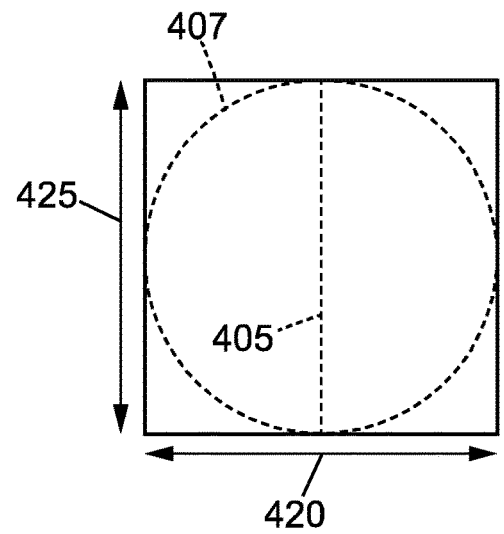
Figure 4C:
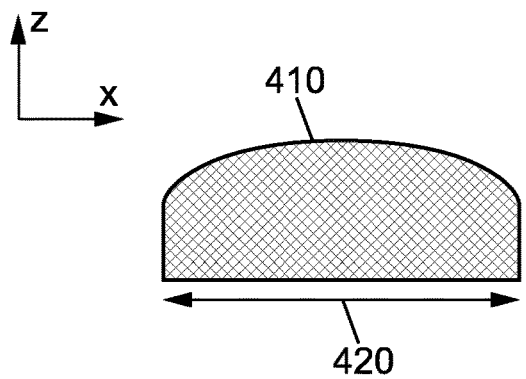
Figure 4D:
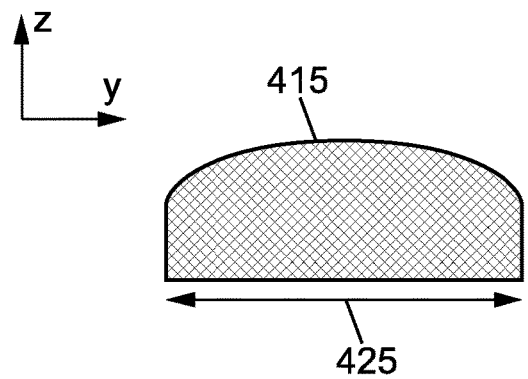

FIG. 4a may correspond to a schematic perspective view of a square transducer 400 of the 2D array 2 comprising a reception (or transmission/reception) surface with a curved shape 401. FIG. 4b may correspond to a top view of the FIG. 4a and which illustrates the shape of transducer 400 which defines an inscribed circle having a diameter larger than 2λ. FIGS. 4c and 4d may represent schematic sectional views in the plan XZ and YZ of the transducer 400 presented at FIG. 4a.

In reference to the FIG. 4a, the transducer 400 may comprise a reception surface 401 with a curved shape. For instance, this curved shape may be a convex shape or a concave shape.

In reference to the FIG. 4b, as explained before, the diameter 405 of the inscribed circle 407 of the square transducer in the surface array is larger than 2λ. In the case of a square transducer, the dimensions 420; 425 of the square transducer may be equal to the diameter of the inscribed circle 407.

In reference to the FIG. 4c, the curved shape may be defined by a first curvature 410 in an XZ plane. In one embodiment, the curvature radius of the first curvature 410 may be comprised between λ and 40λ. In a preferred embodiment, the curvature radius of the first curvature may be comprised between 2λ and 20λ.

In addition of this first curvature, in reference to FIG. 4d, the curved shape of the transmission/reception surface may comprise a second curvature 415 in the plane ZY. In one embodiment, the curvature radius of the second curvature 415 may be comprised between λ and 40λ. In one or several embodiments, the curvature radius of the second curvature may be comprised between 2λ and 20λ. In one or several embodiments, the curvature radius of the second curvature may be equal to the curvature radius of the first curvature.

Such dispositions of the reception (or reception/transmission) surface of the transducers may allow to decrease the directivity of the transducers by acting as a divergent lens according to the Snell's law and the respective ultrasound speeds (in the transducer and in a liquid as water). The focal virtual focal point of the transducer may be located behind the transducer and may be adjusted by choosing the curvature radius of the curved shape.

Such disposition may allow to get defocused ultrasound wave(s) in reception or emission.

According to an example, at a frequency of 1 MHz corresponding to a wavelength λ of 1.54 mm (in water for instance), a square transducer in the surface array which define an inscribed circle with a diameter of 4λ, a convex curved shape with two curvature radius (around X axis and around Y axis) of 2λ, may allow to get a directivity of the transducer comprised between 150 and 180 degrees.

According to another example, at a frequency of 1 MHz corresponding to a wavelength of 1.54 mm in water, a circular transducer with a diameter equal to 2λ or larger, an reception surface with a convex curved shape defined by two curvature radius of 4λ, may allow to get a directivity of the transducer comprised between 60 and 120 degrees.

Figure 5A:
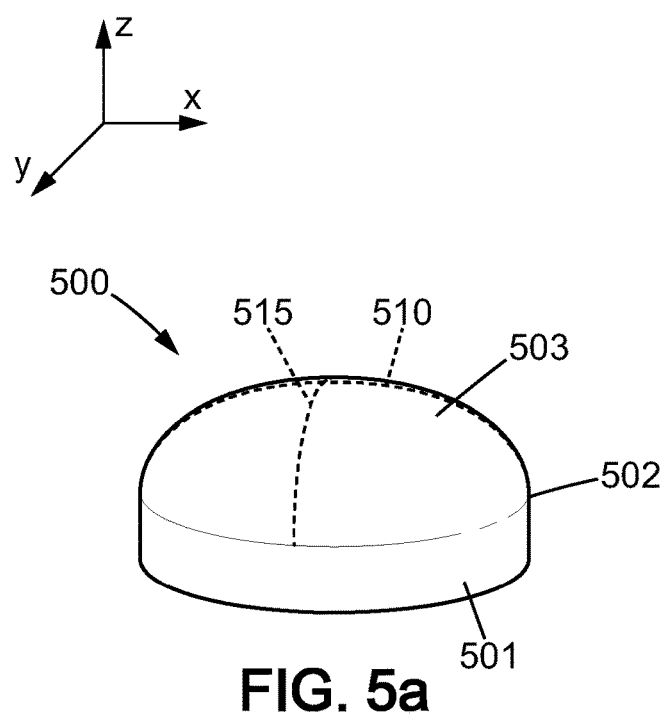
FIG. 5a, FIG. 5b and FIG. 5c schematically illustrate one example of acoustic lens located on the reception surface of a transducer.
Figure 5B:
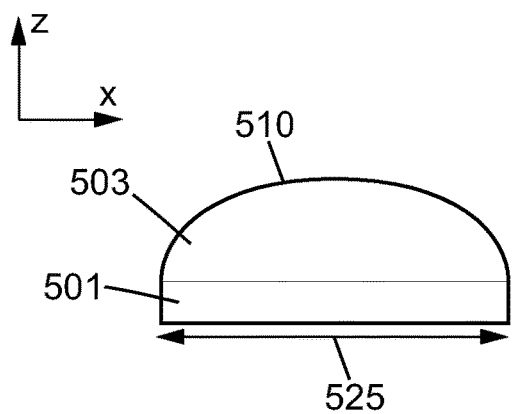
Figure 5C:
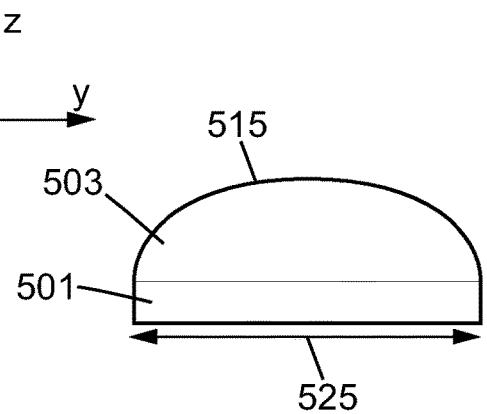

FIG. 5a, FIG. 5b and FIG. 5c schematically illustrate one example of acoustic lens located on the reception surface of a transducer and designed to emulate a transducer with a curved shape in one or several embodiments.

The acoustic lens may be made in at least one material as for instance PDMS (polydimethylsiloxane) or Epoxy or any material suitable to be used for an acoustic lens. In one or several embodiments, the acoustic lens may be made of a plurality of layers and for which each layer is made of a respective material with respective sound velocities.

FIG. 5a may correspond to a schematic perspective view of a circular transducer of the 2d array 2 with a plano-convex acoustic lens 500 acting as a divergent lens. As explained before, the diameter 525 of the circular transducer 501 in the array surface corresponding to the diameter of the inscribed circle may be greater than 2λ. FIGS. 5b and 5c may represent schematic sectional views in the plane XZ and YZ of the transducer and the acoustic plano-convex acoustic lens presented at FIG. 5a.

In reference to the FIG. 5b, the plano-convex acoustic lens may be defined by a plane 502 and a convex surface 503. The plane 502 of the plano-convex lens may be in contact with the reception (or transmission/reception) surface of the transducer 501. The acoustic lens may be configured in so as to match (or fit), completely or partially, the reception surface of the transducers.

In one embodiment, the plane of the plano-convex acoustic lens may have the same shape that the shape of the transducer. For instance, the plane of a plano-convex lens may be rectangular (or square or circular) for a transducer with rectangular (or square or circular) shape.

In reference to FIGS. 5b and 5c, as previously described for the reception surface with a curved shape, the convex surface 503 may be defined by one or several curvatures 510; 515.

In reference to the FIG. 5b, the convex surface 503 may be defined by a first curvature 510 in the plan XZ. In one or several embodiments, the curvature radius of the first curvature may be comprised between λ and 40λ.

In addition of this first curvature, in reference to FIG. 5c, the convex surface 503 may comprise a second curvature 515 in the plan ZY. In one or several embodiments, the curvature radius of the second curvature may be comprised between λ and 40λ. In one or several embodiments, the respective radius of each curvature of convex surface 503 may be equal.

In one or several embodiments, the curvature radius of the first curvature or/and of the second curvature of the convex surface 503 may be comprised between 2λ and 40λ.

Such configurations of acoustic lens (e.g. plano-convex acoustic lens) may allow to get a virtual focal point located behind the transducer comprised between 2λ and 40λ and allow to get a directivity of the transducer comprised between 60 and 150 degrees.

According to an example, at a frequency of 1 MHz corresponding to a wavelength λ of 1.54 mm in liquid (e.g. water), a circular transducer with a diameter in the array surface larger than 2λ and an acoustic plano-convex lens in PDMS with two curvature radius of 3λ may allow to get a directivity for the transducer comprised between 60 and 150 degrees.

In one or several embodiments, the acoustic lens may be a plano-concave lens with a short focal. The focal point of the plano-concave lens may be comprised between 0.1 mm and 1 cm, or/and at least one curvature radius of the plano-concave lens may be comprised between λ and 10λ. The use of short focal point allows to get an acoustic lens acting like a divergent acoustic lens since an ultrasound wave focalized by a plano-concave (i.e. convergent lens) diverges after crossing the focal point of the plano-concave lens.

Such disposition may allow to get defocused ultrasound wave(s) in reception or emission.

In one or several embodiments, it may also be possible to emulate a transducer with a curved shape by using a matrix of transducer elements adapted to be controlled independently. Each sub-transducers of the matrix of transducer elements may be configured to transmit/receive sound signal (e.g. ultrasound wave and/or backscattered signal) in a similar way that the transducers of the 2D array. In the purpose to emulate a transducer with a curved shape at transducer scale, for instance a transducer with a curved surface (e.g. reception/emission surface), a respective electronic time delay may be applied to each transducer element of the matrix of a transducer. In one or several embodiments, the surface of transducer elements may be comprised between $0.1\lambda^2$ and $\lambda^2$.

Thereby, the embodiments presented in the FIGS. 4a to 4d and FIGS. 5a to 5c may allow to increase the opening angle of the transducers (i.e. decrease the directivity), and therefore, to increase the lateral resolution and temporal resolution by collecting more off-axis backscattered signal. The fact to collect more off-axis backscattered signal may improve the synthetic focusing performed for each point of the high-resolution image $H(\vec{r}_p)$ (e.g. high 3D resolution image).

However, the use of transducer with a curved shape or the use of an acoustic lens (e.g. divergent lens) may distort the ultrasound signals at the transmission and lead to difficulty for constructing the focused beamforming at the reception. Thus, it may be required to compensate the use of curved shaped transmission/reception surface or acoustic lens by adding a respective delay on each backscattered signal received by the N transducers after each transmission.

Figure 6:
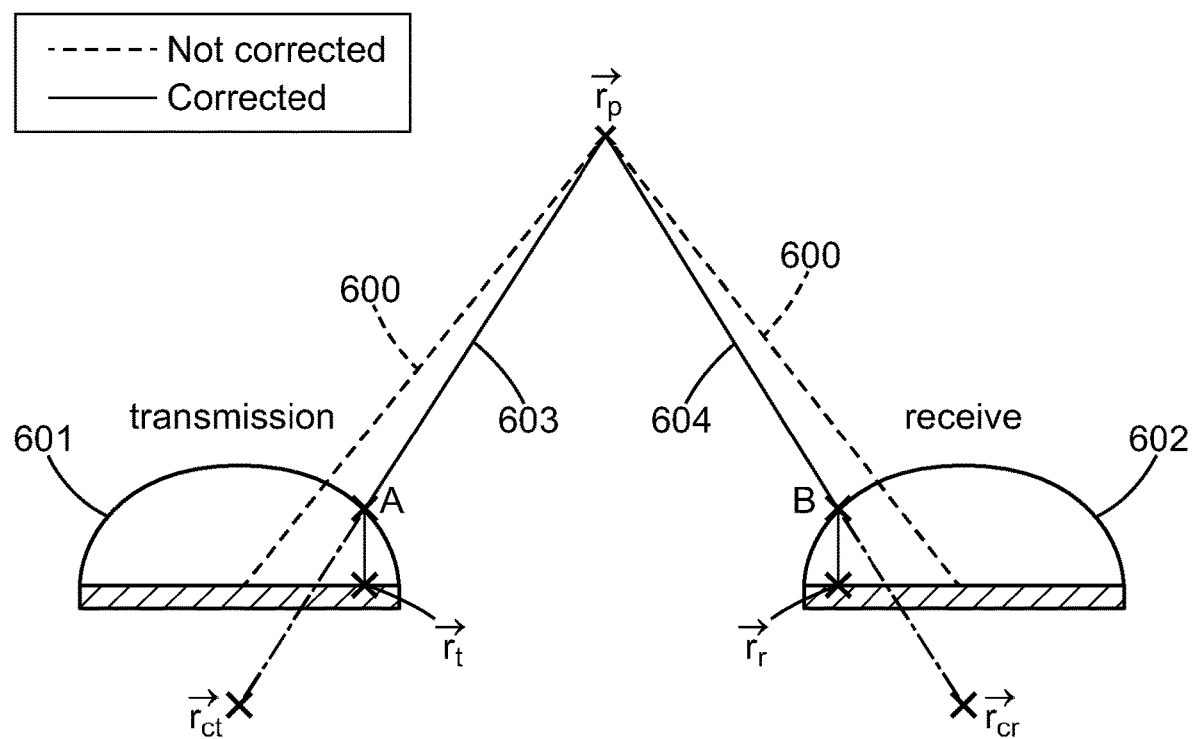
FIG. 6 illustrates the principle for correcting delays for an acoustic lens in one or several embodiments.

FIG. 6 illustrate the principle for correcting delays for an acoustic lens in one or several embodiments.

Non-corrected delay 600 may correspond to the time distance between the region to image and the center of the transducers 601; 602. In one or several embodiments, the corrected delay for an acoustic lens may correspond to take in account the different travel times from the transmit transducer 601 to the region to image and from the region to image to the receiving transducer 602.

The corrective delay when using an acoustic lens may be taken in account by replacing the previous mentioned equation (1) by the following equation:

$$t(\vec{r}_p, \vec{r}_t, \vec{r}_r, \vec{r}_{ct}, \vec{r}_{cr}) = t_{lt} + t_t + t_r + t_{lr} \quad (4)$$

In this equation (4), $\vec{r}_p$ may correspond to the point in the image, $\vec{r}_{ct}$ may be the location of the transmit transducer curvature center, $\vec{r}_t$ may be the location on the transmit transducer of the normal projection of the point A which intersects the transmit beam 603 and the acoustic lens 601, $\vec{r}_{cr}$ may be the location of the receive transducer curvature center, and $\vec{r}_r$ may be the location on the receiving transducer of the normal projection of the point B which intersects the receive beam 604 and the acoustic lens 602. $t_{lt}$ may correspond to the time for the beam (i.e. ultrasonic wave) to travel in the acoustic lens 601 from $\vec{r}_t$ to A, $t_t$ may correspond to the time for the beam to travel in the medium from A to $\vec{r}_p$, $t_r$ may correspond to the time for the beam to travel in the medium from $\vec{r}_p$ to B, and $t_{lr}$ may correspond to the time for the beam to travel in the acoustic lens 602 from B to $\vec{r}_r$.

Thus, the focusing for a single fire may be performed by adding the received signal g(t, i) from all transducers in phase, $\vec{r}_r(i)$ may be the position of the i-th receive transducers. The focused signal L may be:

$$L_j(\vec{r}_p) = \sum_{i=1}^{N_r} g(t_{lt}(j), t_t(j), t_r(i), t_{lr}(i), i) \quad (5)$$

The synthetic focusing may be then obtained according to the equation (3) previously mentioned.

In one or several embodiments, the real delays can also be assessed experimentally by measuring delays with a hydrophone.

In one or several embodiments, for a transducer with a curved shape (e.g. convex shape), $t_{lt}$ and $t_{lr}$ may be considered as zero in the above equation.

Figure 7:
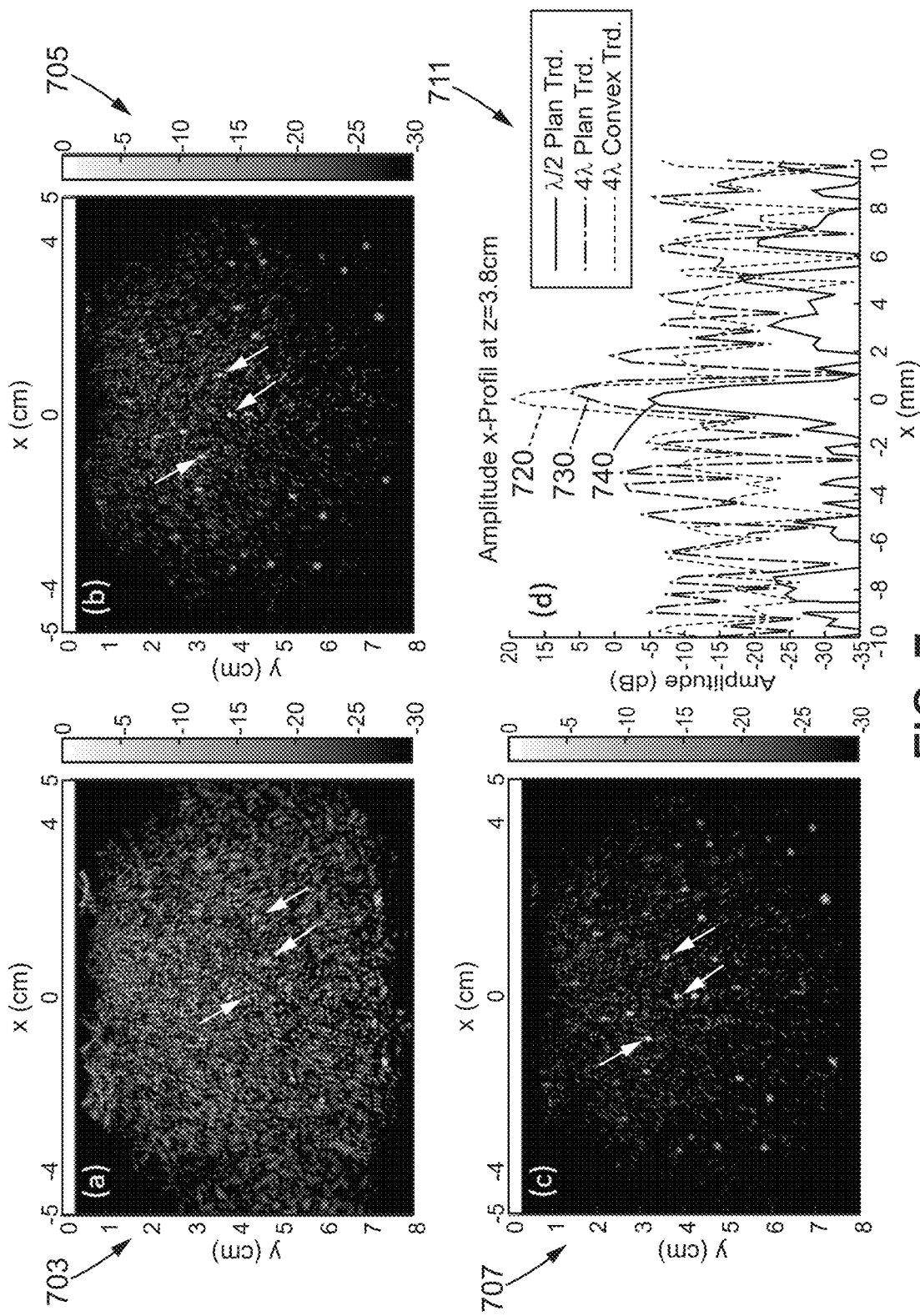
FIG. 7 illustrates a comparison by simulation of different configurations of transducers of a 2D array in reception for 3D ultrasound imaging.

FIG. 7 illustrates a comparison by simulation of different configuration of transducers of a 2D array in reception for 3D ultrasound imaging.

Each image 703, 705; 707 may be the result of an imaging simulation of 500 scatters (also called 3D phantom imaging) from 169 square shaped transducers of a surface array (5×5 cm) with different configurations for the square shaped transducers. The transmission source, by synthetic aperture for instance, may be set at 1.5 MHz corresponding to a wavelength λ of 1.03 mm and may be performed by 9 transducers. These 9 transducers may be transducers from the 2D array used for the reception or may be transducers from another 2D array.

The image 703 may be obtained by using a 2D ultrasound array of square shaped transducers, the square shaped of the transducers may define an inscribed circle having a diameter equal to four time the wavelength. The dimensions of the transducers then correspond to 4λ×4λ in the surface array.

The image 705 may be obtained by using a 2D ultrasound array of conventional transducers for which the dimensions of transducers may be 0.5λ×0.5λ in the surface array.

The image 707 may be obtained by using 2D ultrasound array of square shaped transducers comprising a reception surface (or transmission/reception surface) with a curved shape (convex shape), according to one or several embodiments of the present disclosure. More particularly, the square shaped of the transducers defines an inscribed circle having a diameter equal to four time the wavelength and the radius of curvatures of the reception surface (or transmission/reception surface) are $3\lambda$.

Finally, the graph 711 presents the amplitude according to X axis of backscattered signal coming from a scatter located at x=0 and z=3.8 centimeters for each previously mentioned configuration. Thus, the curve 720 corresponds to the configuration of transducers giving the image 707, the curve 730 corresponds to the configuration of transducers giving the image 703, and the curve 740 corresponds to the configuration of transducers giving the image 705.

From the graph 711, it may be noticed that the use of greater dimensions of transducers, with 720 or without 730 curvature, may allow to improve the sensibility (i.e. increase the signal-noise-ratio) in comparison with conventional dimensions of transducers 740.

Likewise, transducers of 2D array comprising a reception surface with a curved shape 707 may also allow to improve the sensibility as well as the contrast (white arrows on the images 703, 705, 707) in comparison with conventional of transducers 705 or in comparison with transducers of the same dimensions 703 but without a curved shape of the reception surface.

Figure 8:
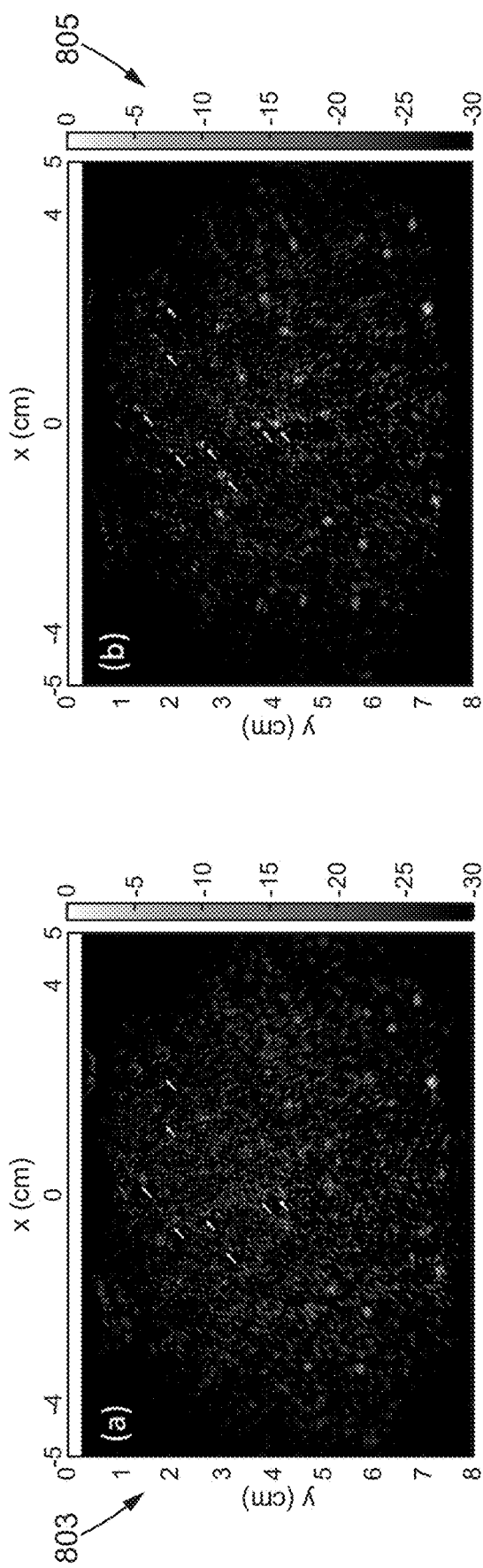
FIG. 8 illustrates the effect of a corrective delay when the reception surface of transducer of a 2D array comprises a curved shape.
Figure 8:
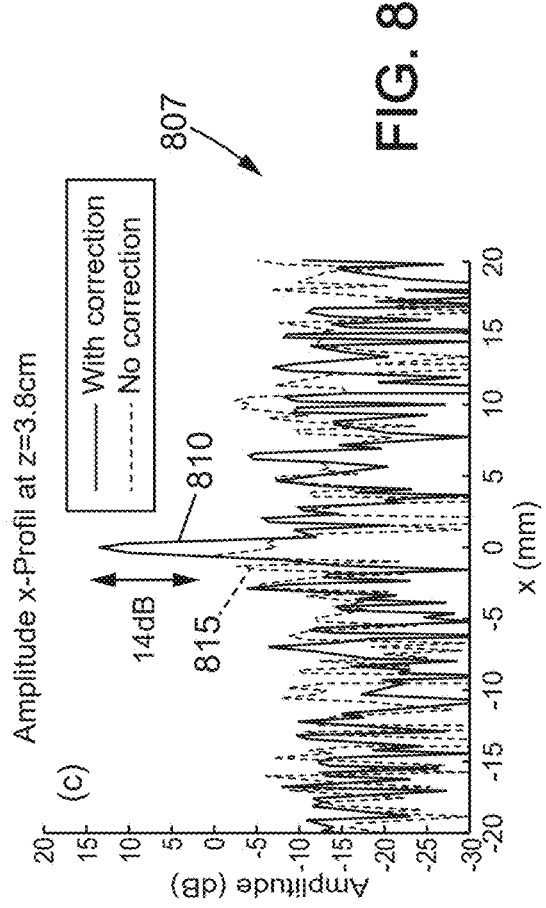

FIG. 8 illustrates the effect of a corrective delay when the reception surface of transducer of a 2D array comprises a curved shape.

Each image 803 and 805 may be the result of an imaging simulation of 800 scatters (also called 3D phantom imaging) from for a same configuration of surface array (5×5 cm) comprising 169 circular transducers with diameter larger than $2\lambda$, i.e. corresponding to a diameter of the inscribed circle larger than $2\lambda$. The transmission source, by synthetic aperture, may be set at 1.5 MHz corresponding to a wavelength $\lambda$ of 1.04 mm in a water and may be performed by 9 convex circular transducers.

The image 803 may be obtained by applying no corrective delay on raw signal data resulting of the backscattered signal received at the transducers. The image 805 may be obtained by applying a corrective delay on raw signal data. According to an example, the corrective delay taking account curved shape (convex in this case) may be comprised between 1 and 50 microseconds.

At last, the graphic 807 presents the centered amplitude of backscattered signal coming from a scatter located at x=0 and z=3.8 centimeters for both images 803, 805.

From the graph 807, it may be noticed that the application of a corrective delay 810 on the raw signal data may allow to improve the sensibility (i.e. increase the signal-noise-ratio) in comparison with a similar configuration of convex transducers without applying a corrective delay 815.

Likewise, as noticed on the images 803 and 805, the application of a corrective delay in order to taking account the convex shape of the transmission/reception surface of the transducers allows to improve the sensibility as well as the contrast (white arrows on the images 803 and 805) in comparison with a similar configuration of convex transducers without applying a corrective delay.

Example of Applications

Such dispositions of the probe with ultrasound 3D imaging device presented above may allow to perform 3D (or 4D) ultrasound image. Particularly, it may be possible to perform 3D ultrasound imaging, with a high resolution, of whole organs which may be located behind bones or located deeply from the skin surface, as for instance the brain or the heart. Indeed, the use of large transducers combined with a respective curved shape may guarantee a high energy transmission as well as a high reception sensitivity while keeping a large aperture, and therefore a high resolution and a large field of view of the organs to imaged.

Figure 9:
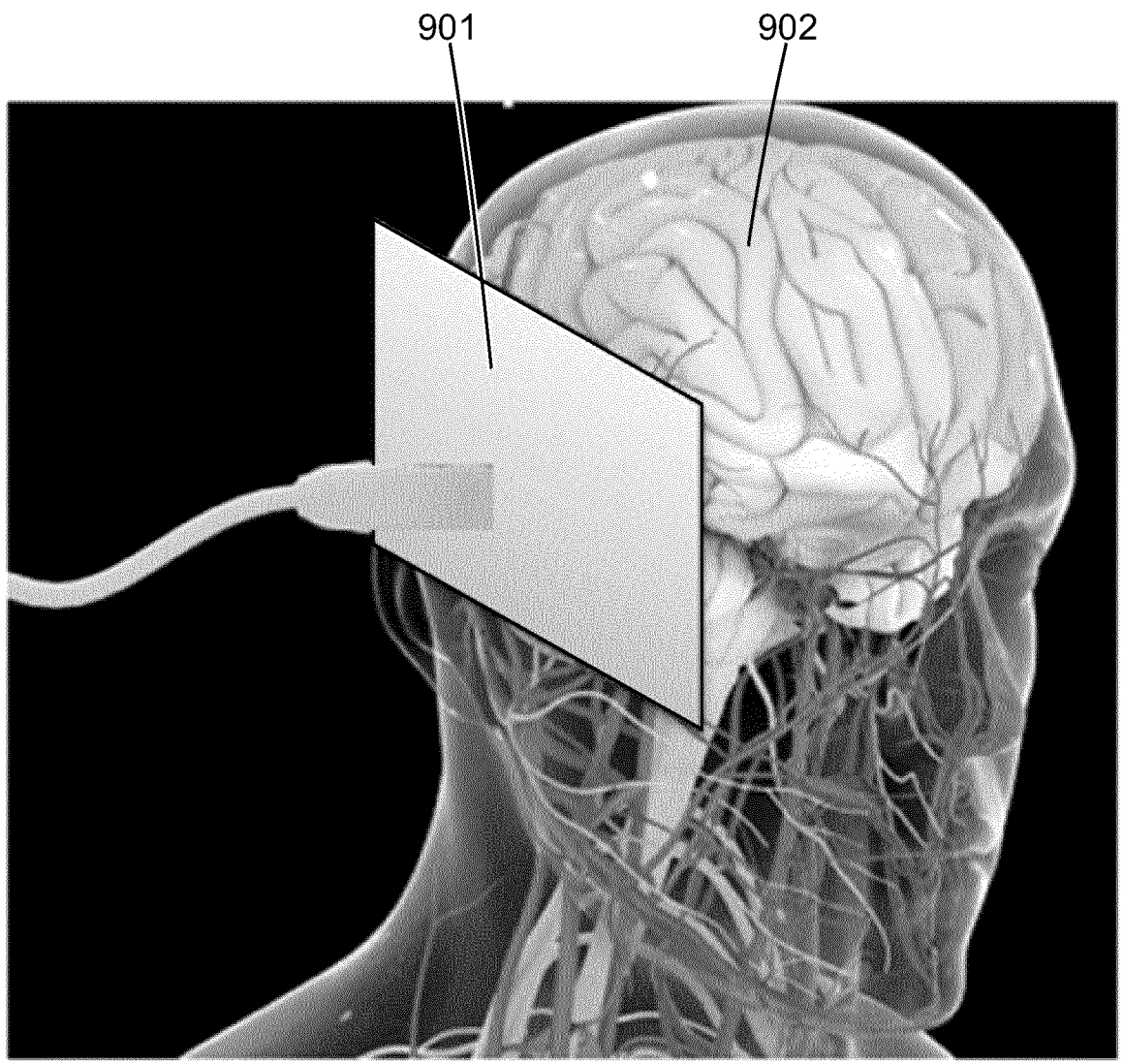
FIG. 9 illustrates a first example of application of an 3D ultrasound imaging device in one or several embodiments.

For instance, FIG. 9 illustrates a first example of application of an 3D ultrasound imaging device in one or several embodiments.

A probe 901 of the 3D ultrasound imaging device according to the present disclosure may be positioned at the surface of the patient's head 902. In or more embodiments, the probe may be positioned manually or by a robotic arm controlled by an operator. The frequency (or the central frequency) of the emission may be comprised between 0.5 and 3 MHz. In order to favorize the transmission and the reception of the ultrasound waves between the head's surface and the probe, a liquid/gel may be used.

Such dispositions may allow to perform 3D or 4D ultrasound imaging (or ultrasound ultrafast imaging) of a brain of a patient with a large field of view.

Furthermore, the robotic arm piloting the location of the probe may be used to perform imaging at several location of the head in order to reconstruct au full 3D image of the brain in a quick and efficient way.

According to an embodiment, the probe may be plan as presented at the FIG. 8 or may located in a helmet placed on the head of patient.

According to an embodiment, the probe may be plane or curved shape. If the array is curve-shaped, the above references to the plane of the array should be understood as the array surface adapted to be placed in contact with the region to image.

According to one or several embodiments, the surface of the ultrasound 2D array may be larger than $1000\lambda^2$ allowing to increase the field of view.

In or more embodiments, may be positioned at the surface of the patient's skin, on the head for brain imaging or on the chest for the heart imaging for instance.

In one or several embodiments, the probe may be used as only receiver. In such embodiment, a second probe may be used to generate the ultrasound waves in the medium. In one or several embodiments, the ultrasound wave may be generated by a photo-acoustic effect, for instance a laser may be used for generated ultrasound acoustic waves in the medium. In such case, the transmission/reception surface of the transducers of the probe 901 may be only used for receiving the backscattered ultrasonic wave.

In one or several embodiments, the ultrasound 3D imaging method may be carried out as follow:
  acquiring signals from backscattered ultrasonic waves propagated in a region to image in response to each transmitted ultrasonic wave,
  generating a 3D image based on the acquired signals, said backscattered ultrasonic waves having said wavelength $\lambda$.
  applying a corrective delay on the acquired signals obtained after each transmitted ultrasonic wave to obtain a corrected acquired signals, said corrective delay taking into account the curved shape of the transmission surface,
  applying beamforming on the corrected acquired signals to perform dynamic focusing and generating the 3D image; the beamforming may be performed in reception for each transmitted wave to perform coherent compounding or synthetic aperture imaging.

The ultrasonic waves may be transmitted in the region to image according to the synthetic aperture method previously described.

The 3D generated ultrasound image may be, for instance, a 3D image of a vasculature of a whole organ. An 3D image of vasculature of a whole organ may be obtained by using a superlocalization algorithms (or ultrasound localization algorithm) to localize or/and track microbubbles injected in the blood flow of the region to image, e.g. the vasculature of an organ to image. Such use of superlocalization algorithm with microbubbles may allow to generate vascular maps with a high spatial resolution. Indeed, it may be possible to obtain a resolution of the vasculature of an organ as small as ten micrometers, over an order of magnitude smaller than the ultrasound diffraction limit, and at depths much greater than the traditionally frequency-limited imaging depth. The 3D ultrasound generated image using a superlocalization algorithm may be called a 3D super-resolution ultrasound image.

Such superlocalization algorithm may be carried out as follow:
/a/ detecting the microbubbles including:
  applying a SVD clutter filter on 3D B-mode volumes to remove signal from the tissue and only keep microbubbles,
  detecting local maxima in in each 3D B-mode volumes,
  applying an energy level threshold based on the mean energy level of a microbubble to remove false positive microbubbles,
  applying a correlation value threshold based on 3D Point Spread Function (PSF) correlation to remove false positive microbubbles,
/b/ tracking the microbubbles by:
  detecting the exact center of a microbubble by using a 3D paraboloid interpolation on the voxels around the microbubble maximum,
  using coordinates of exact centers, tracking bubbles frame to frame
  recovering location and speed of track,
/c/ generating a super-resolved volume by:
  reconstructing a super-resolved volume on a grid, the density of the super-resolved volume is the number of microbubbles in each voxel of the grid, the speed of the super-resolved volume is the average speed in each voxel of the grid,
/d/ generating a 3D super resolved image based on the super resolved volume.

Figure 10:
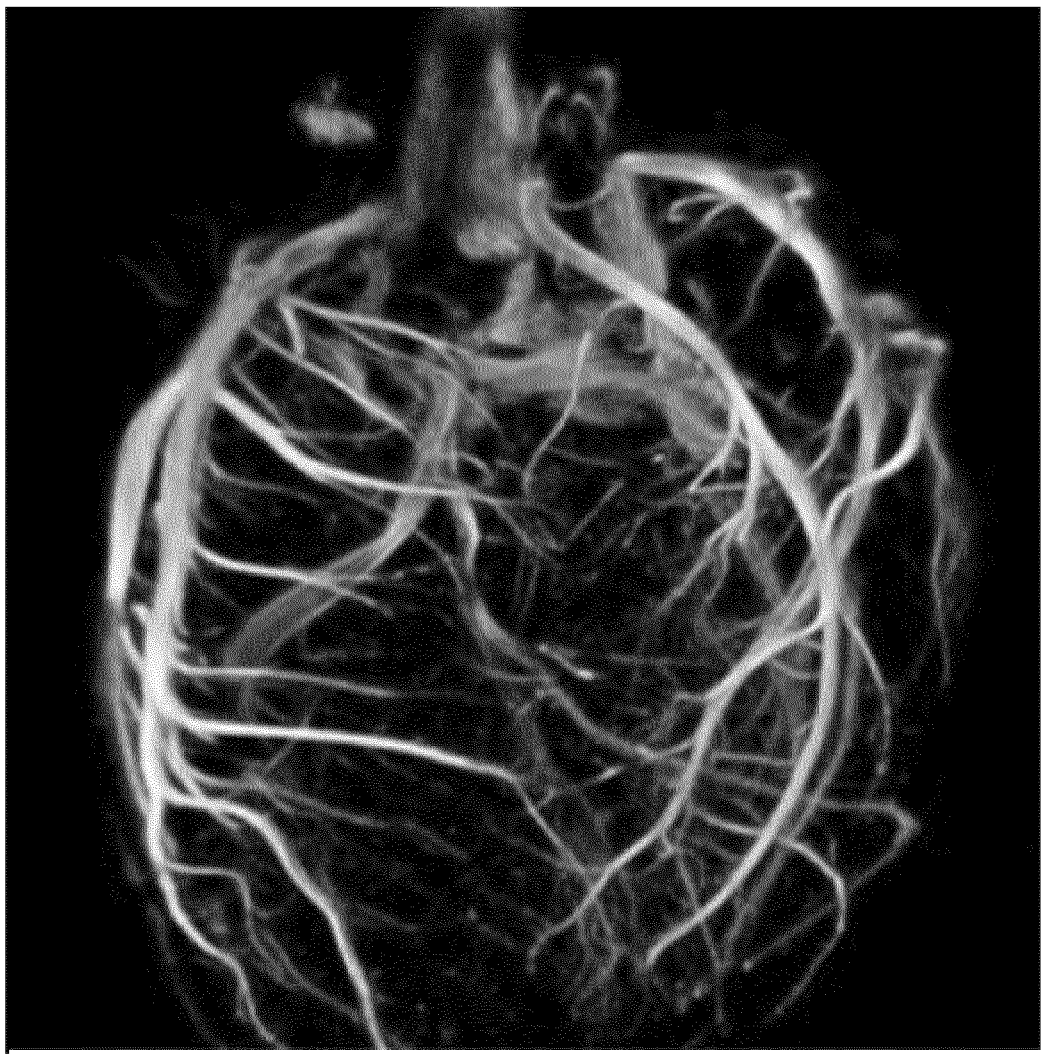
FIG. 10 illustrates an example of 3D super-resolution ultrasound imaging obtained by using the superlocalization algorithm in one or several embodiments.

FIG. 10 illustrates an example of 3D super-resolution ultrasound imaging obtained by using the superlocalization algorithm in one or several embodiments.

The FIG. 10 corresponds to a 3D ultrasound coronary microcirculation imaging on isolated beating rat heart obtained by using conventional 3D ultrasound imaging probe (10 cm×10 cm) transducers with a size for each transducer of 0.3λ×0.3λ, and combined with the use of microbubbles and superlocalization algorithm.

For performing the 3D on FIG. 10, plane waves were emitted by matrix transducers at high repetition rate in order to reconstruct the 3D image over entire volumes at high volume/rate.

As it may be seen on the FIG. 10, the injection of microbubbles in the blood flow of the heart which are then localized and/or tracked may allow to obtain a high resolution imaging of a vasculature of a heart with a resolution smaller than 10 μm. Because of the high repetition rate, it may be possible to follow the blood circulation in the vasculature of the heart.

Furthermore, thanks to the resolution smaller than 10 μm, it may be possible to locate with a potential disease with a high precision in the vasculature, but also, but also, to identify earlier diseases that would not have been identified with traditional 3D imaging techniques.

Figure 11:
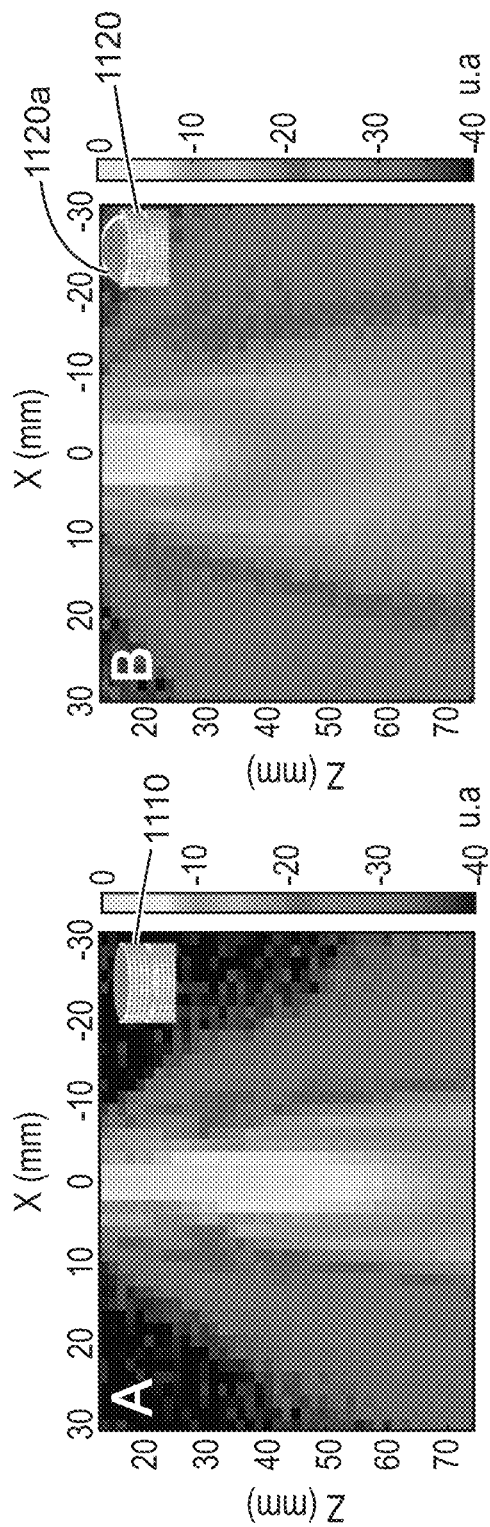
FIG. 11 illustrates an experimental example of a transducer with a divergent lens transmitting ultrasound wave in a medium.

FIG. 11 illustrates an experimental example of a transducer with a divergent lens transmitting ultrasound wave in a medium.

In the FIG. 11, it is illustrated the impact on the directivity of a transducer when it is combined with a curved shape, for instance a divergent lens.

The image A of the FIG. 11 illustrates the case where a transducer 1110 is not combined with a divergent lens (i.e. acoustic lens) and transmits ultrasound wave(s) in a medium. The image A presents a cut in the medium according to a XZ windows with the X-axis corresponding to the lateral dimension and Z-axis corresponding to the depth in the medium.

The image B of the FIG. 11 illustrates the case where a transducer 1120 is combined with a divergent lens (i.e. acoustic lens) 1120a and transmits ultrasound wave(s) in a medium. The image B presents a cut in the medium according to a XZ windows with the X-axis corresponding to the lateral dimension and Z-axis corresponding to the depth in the medium.

Each image A and B from FIG. 11 may be obtained based on the maximum transmitted pressure signals recorded by a hydrophone at each point of space in response to the transmitted ultrasound wave(s) in the medium. The frequency of the ultrasound wave(s) is 1 MHz). The scale in arbitrary unit (u.a.) may represent the intensity of the ultrasound wave(s) in decibel for instance.

From the images A and B, it may be noticed that the use of divergent lens 1120 may allow to increase the opening angle of the transducers (i.e. decrease the directivity), i.e increase the lateral dimension, and therefore may allow to defocus the ultrasound wave(s) in reception or/and in emission.

Figure 12:
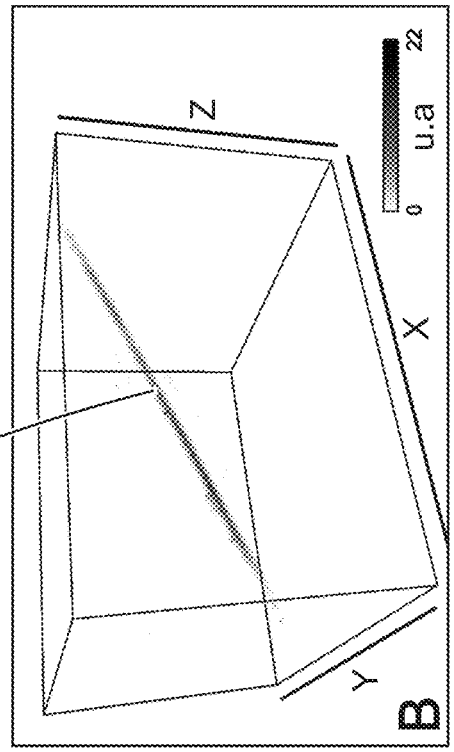
FIG. 12 illustrates a probe with transducers having divergent lens and an image of microbubbles flowing in a tube obtained by using such probe.
Figure 12:
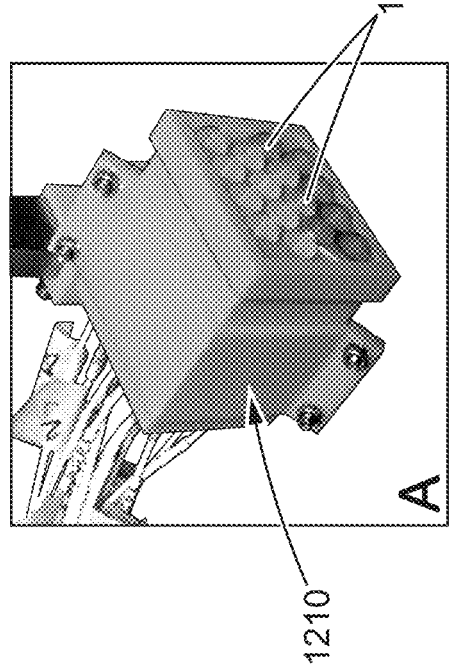

FIG. 12 illustrates an ultrasound probe with transducers having divergent lens and an image of microbubbles in a tube obtained by using such ultrasound probe using ultrasound localization microscopy algorithm to detect and track the bubbles in the tube The ultrasound probe 1210, presented in the image A of FIG. 12, may be configured and be arranged to be used with the apparatus for ultrasound imaging presented at FIGS. 1 and 2.

The ultrasound probe 1210 may comprise a matrix array with a plurality of transducers, for instance 16 transducers (or ultrasound transducers). Each transducer of the matrix array may be combined with a divergent lens 1220. The ultrasound probe may be connected to the apparatus for ultrasound imaging presented at FIGS. 1 and 2.

The apparatus for ultrasound imaging combined with such ultrasound probe may be used to image and track microbubbles in a fluid (e.g. water) comprised in a tube smaller than the acoustic wavelength which is 1.5 mm. The image of the tube after microbubbles tracking is presented at the image B of the FIG. 12. The tube and its diameter may be representative of a vessel of a vascular system. From image B, it may be seen that it is possible to track and image microbubbles 1250 in a tube smaller than the acoustic wavelength to obtain a high-resolution image, and therefore, showing it may be possible to get a high resolution (typically wavelength/10 e.g. smaller than 150 μm) in vessels of the vascular system (or vasculature), and therefore it may be possible to locate with a potential disease with a high precision in the vasculature, but also, to identify earlier diseases that would not have been identified with traditional 3D imaging techniques. The method could also be used to assess flow velocity in the vessels and obtain functional information of the microvascular network.

The invention claimed is:

1. Ultrasound 3D imaging probe comprising an array having transducers, each transducer being configured for at least acquiring a backscattered ultrasonic wave from a region to image in a medium following an ultrasound emission in said medium, said backscattered ultrasonic wave having a central frequency corresponding to a wavelength λ when said backscattered ultrasonic wave is propagated in said medium, said array forming an array surface adapted to be placed in contact with said medium and each transducer having a reception surface for at least receiving said backscattered ultrasonic waves, wherein each transducer has a shape in the array surface which defines an inscribed circle having a diameter larger than 2λ, and wherein each transducer:
 either has a reception surface that is curved in at least one plane perpendicular to said reception surface,
 and/or wherein each transducer is fitted with an acoustic lens designed to emulate a transducer with a curved shape with a curvature in at least one plane perpendicular to said reception surface,
 and/or is formed by a matrix of transducer elements adapted to be controlled independently.

2. Ultrasound 3D imaging probe according to claim 1 wherein said reception surface of each transducer has a curved shape and said curvature has at least one curvature radius comprised between λ and 40λ,
 or said reception surface of each transducer has a curved shape and said curved shape is convex.

3. Ultrasound 3D imaging probe according to claim 1, wherein said reception surface of each transducer is fitted with an acoustic lens designed to emulate a transducer with a curved shape, the acoustic lens has an outer surface, opposite said reception surface of the transducer, said outer surface being convex or concave.

4. Ultrasound 3D imaging probe according to claim 3, wherein said outer surface is convex and has a curvature in at least one plane perpendicular to said outer surface and said curvature has at least one curvature radius comprised between λ and 40λ,
 or wherein said outer surface is concave and has a curvature in at least one plane perpendicular to said outer surface and said curvature has at least one curvature radius comprised between λ and 40λ.

5. Ultrasound 3D imaging probe according to claim 1, wherein said acoustic lens is a compound acoustic lens comprising several materials associated respectively to several sound velocities.

6. Ultrasound 3D imaging probe according to claim 1, wherein said diameter is larger than 30 micrometers.

7. Ultrasound 3D imaging device comprising at least:
 an ultrasound 3D imaging probe according to claim 1;
 a control unit configured for acquiring signals from said backscattered ultrasonic waves received by the transducers from the region to image in response to each transmitted ultrasonic wave, wherein the control unit is further configured for generating a 3D image based on the acquired signals.

8. Ultrasound 3D imaging device according to claim 7, wherein said control unit is further configured to have said transducers transmit ultrasonic waves in the region to the image to generate said backscattered ultrasonic waves.

9. Ultrasound 3D imaging device according to claim 8, wherein the control unit is further configured to apply a corrective delay on acquired signals obtained after transmission of each transmitted ultrasonic wave, said corrective delay taking into account the curved shape of the transmission surface.

10. Ultrasound 3D imaging device according to claim 7, wherein each transducer of the ultrasound 3D imaging probe is formed by a matrix of transducer elements adapted to be controlled independently, and said control unit is configured to apply time delays on the transducer elements of the matrix of a transducer to emulate a transducer with a curved shape at the transducer scale.

11. A method of ultrasound imaging comprising:
 transmitting ultrasonic waves in the region to image and receiving backscattered ultrasonic waves by the ultrasound 3D imaging probe according to claim 1;
 acquiring signals from backscattered ultrasonic waves propagated in a region to image in response to each transmitted ultrasonic wave;
 generating a 3D image based on the acquired signals, said backscattered ultrasonic waves having said wavelength λ.

12. The ultrasound imaging method according to claim 11 wherein the ultrasonic waves are transmitted in the region to image according to a synthetic aperture method.

13. The ultrasound imaging method according to claim 11, wherein the method further comprises:
 applying a corrective delay on the acquired signals obtained after each transmitted ultrasonic wave to obtain a corrected acquired signals, said corrective delay taking into account the curved shape of the transmission surface,
 applying beamforming on the corrected acquired signals to perform dynamic focusing and generate the 3D image; wherein said beamforming is performed in reception for each transmitted wave to perform coherent compounding or synthetic aperture imaging.

14. The ultrasound imaging method according to claim 11, wherein microbubbles are present in the medium to image and are localized and/or tracked in the 3D image using a super-localization algorithm, and wherein the super-localization algorithm comprises:
 /a/ detecting the microbubbles including:
  applying a SVD clutter filter on 3D B-mode volumes to remove signal from the tissue and only keep microbubbles,
  detecting local maxima in each 3D B-mode volumes,
  applying an energy level threshold based on the mean energy level of a microbubble to remove false positive microbubbles,
  applying a correlation value threshold based on a 3D Point Spread Function (PSF) correlation to remove false positive microbubbles,
 /b/ tracking the microbubbles by:
  detecting an exact center of a microbubble by using a 3D paraboloid interpolation on the voxels around the microbubble maximum,
  using coordinates of exact centers, thereby tracking bubbles frame to frame
  recovering a location and a speed of track,
 /c/ generating a super-resolved volume by:
  reconstructing the super-resolved volume on a grid, wherein a density of the super-resolved volume is the number of microbubbles in each voxel of the grid, the speed of the super-resolved volume is the average speed in each voxel of the grid, and /d/ generating a 3D super resolved image based on the super-resolved volume.

15. The method according to claim 11 wherein the acquiring signals from backscattered ultrasonic waves propagated in a region to image in response to each transmitted ultrasonic wave is performed using the ultrasound 3D imaging device according to claim 7.

* * * * *